United States Patent

[11] 3,620,254

[72] Inventors Paul Mongerson
Elyria;
Alfred M. Moen, Grafton; Frank W. Bell, Avon, all of Ohio
[21] Appl. No. 859,835
[22] Filed Sept. 22, 1969
[45] Patented Nov. 16, 1971
[73] Assignee Standard Screw Company
Hartford, Conn.

[54] HANDLE VALVE
11 Claims, 13 Drawing Figs.
[52] U.S. Cl. .................................................. 137/625.17,
137/625.31
[51] Int. Cl. ........................................................ F16k 11/07
[50] Field of Search .......................................... 137/625.17,
625.4, 625, 625.46, 625.31

[56] References Cited
UNITED STATES PATENTS
3,428,088  2/1969  Bell ........................... 137/625.17
3,189,048  6/1965  Parker et al. .............. 137/625.17
3,282,295  11/1966  Skriletz ..................... 137/625.17
3,415,280  12/1968  Bucknell et al. ........... 137/625.17
3,460,571  8/1969  Moen ........................ 137/625.17
2,878,829  3/1959  Folmsbee .................. 137/625.46 X FOREIGN PATENTS
1,456,475  10/1966  France ...................... 137/625.17

Primary Examiner—M. Cary Nelson
Assistant Examiner—Richard Rothman
Attorney—Parker, Carter & Markey ABSTRACT: A single handle mixing faucet having a body member with inlet passages terminating at the exterior of the body member. A handle is reciprocal and rotatable on the body member and includes a confined circumferentially extending mixing chamber arranged to be placed into selective communication with the hot and cold water inlet passages terminating on the exterior of the body member. The body member is secured to an underlying support by a fastener which extends completely through the body member and has a tool-receiving opening at its upper end. In one form there are two discharge passages in the body member and cooperative means on the body member and handle to select one or the other of the discharge passages. In another form, the discharge passage extends away from the inlet passages and into a spout support which is mounted on top of the body member. The handle means which is reciprocal and rotatable on the body member includes a plurality of inlet ports arranged in two sets, one for hot water and one for cold water. The ports are generally uniformly arranged with there being more cold water ports than hot water ports so as to provide a greater degree of handle rotation within the comfort zone.

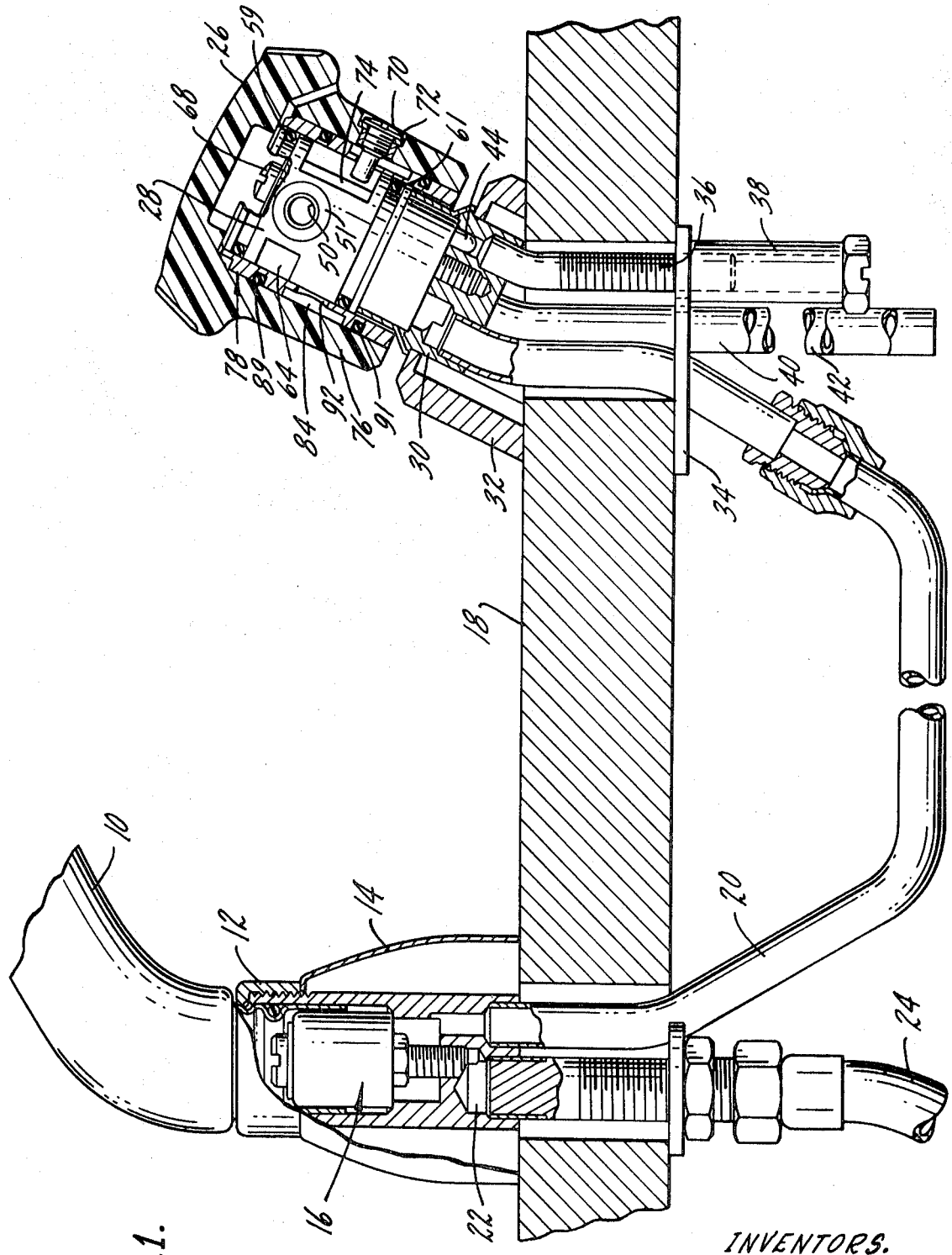

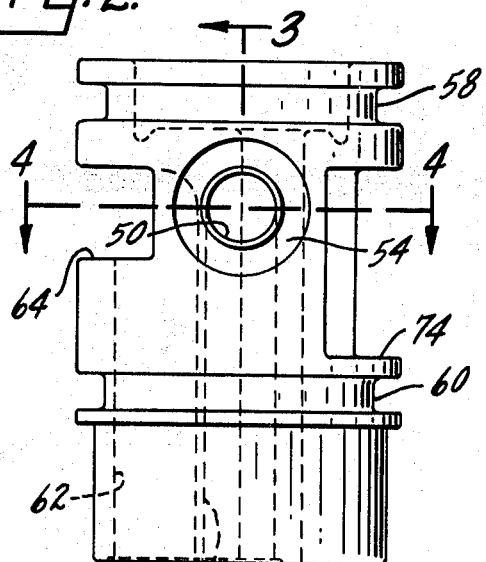
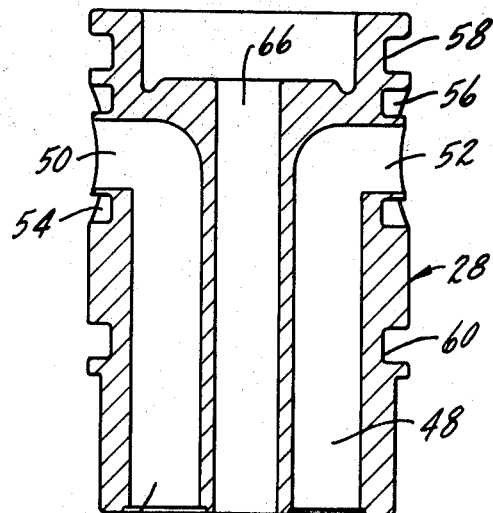
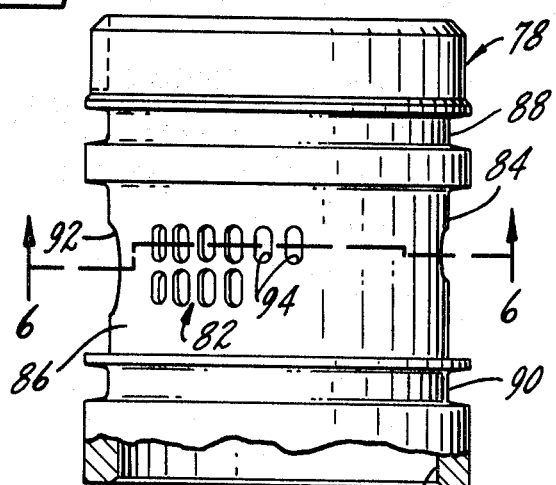
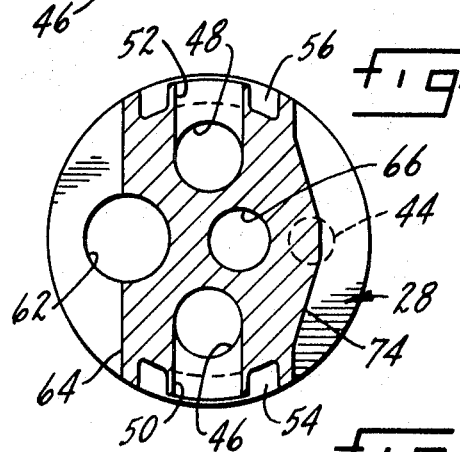
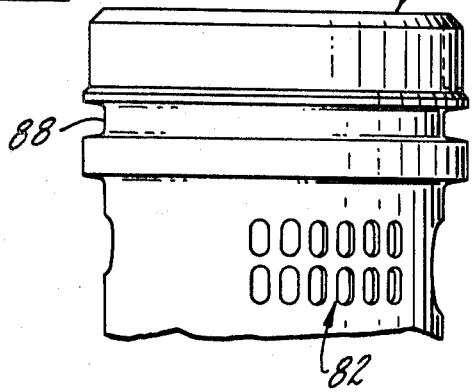
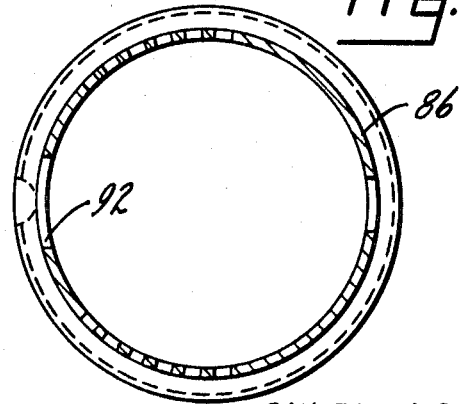

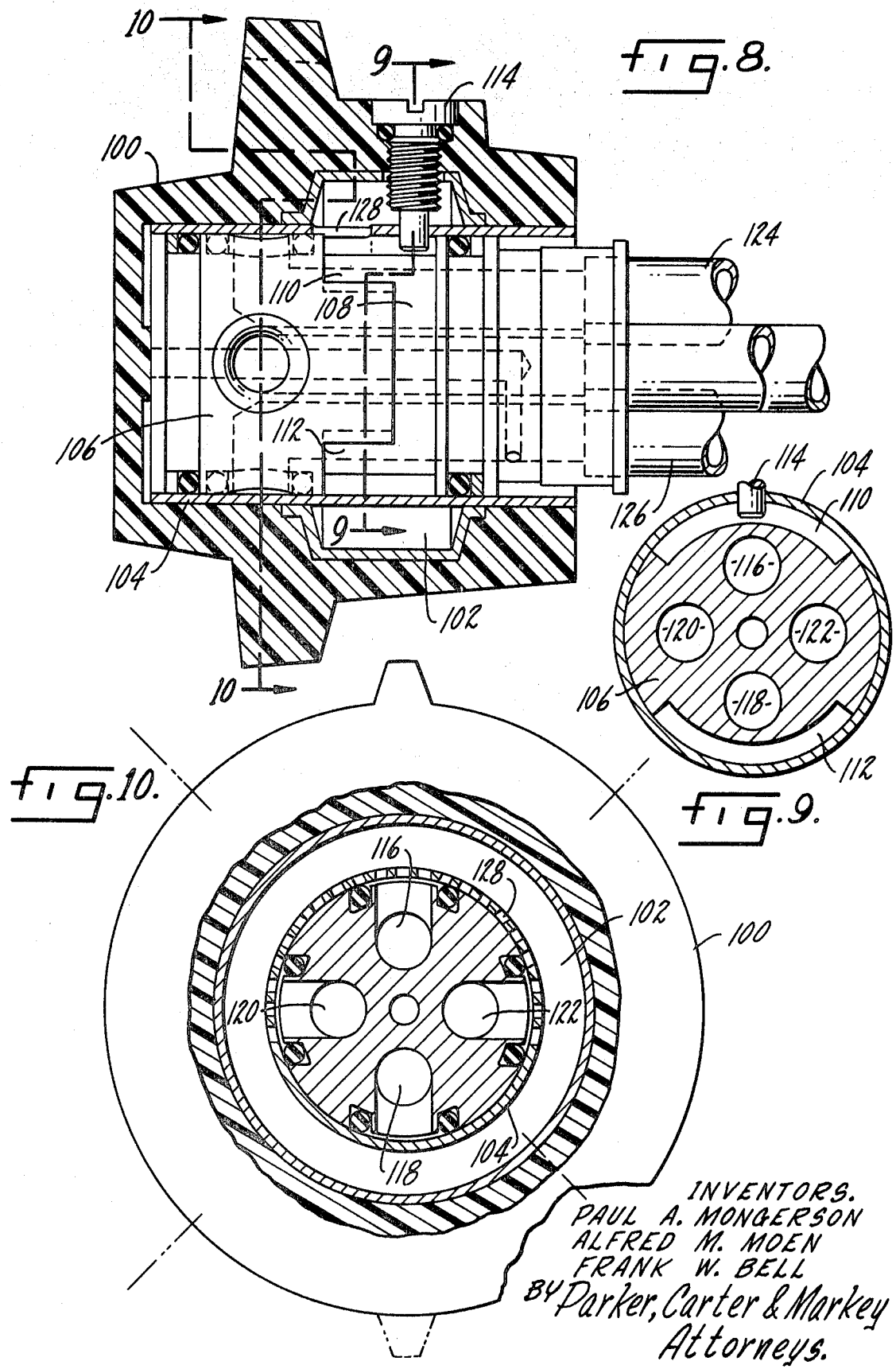

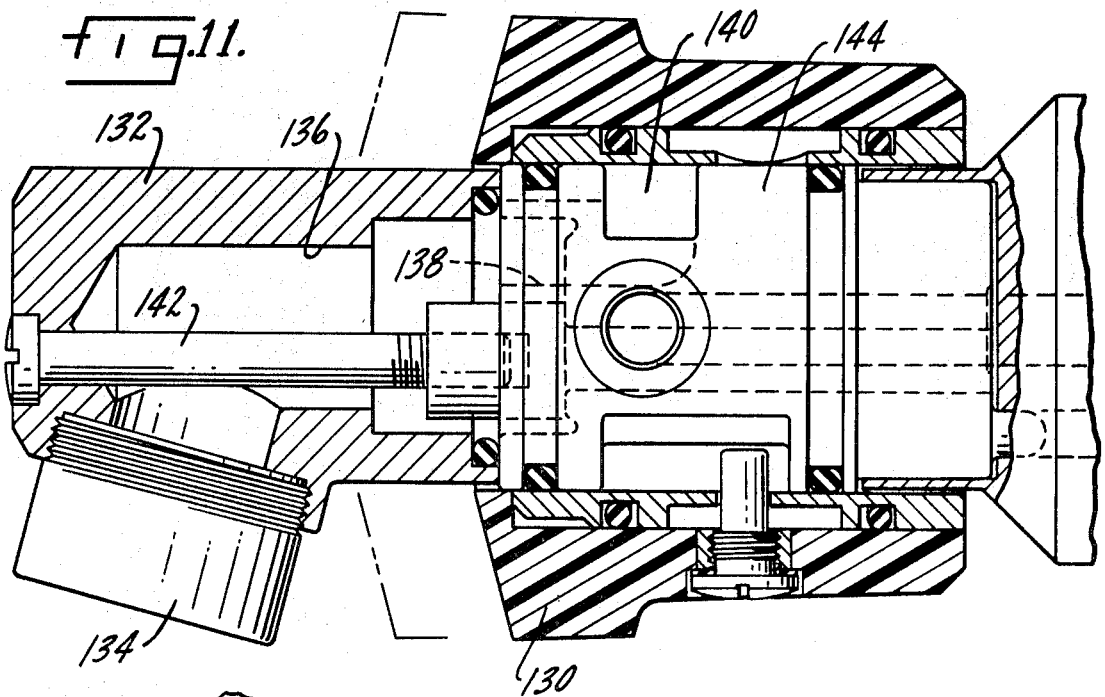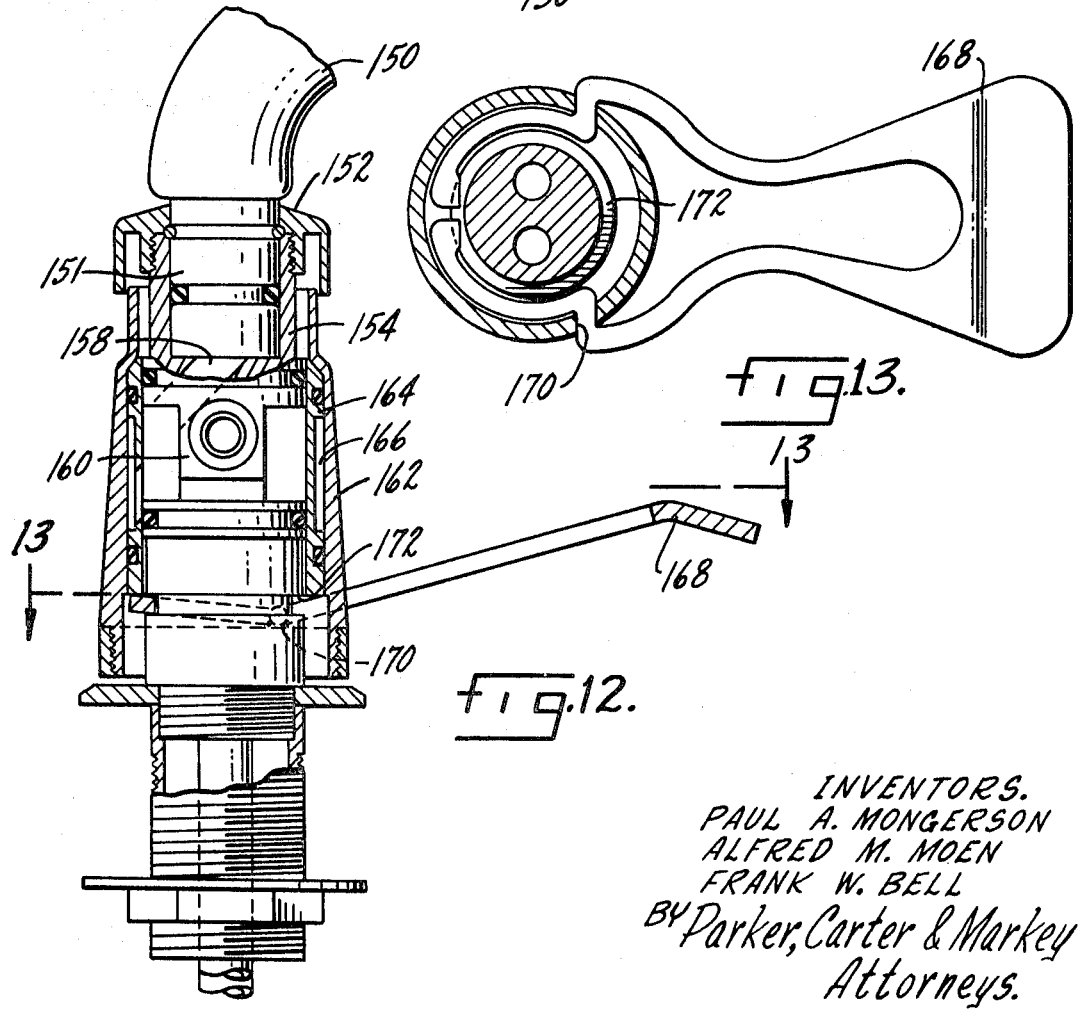

3,620,254

HANDLE VALVE

SUMMARY OF THE INVENTION

The present invention relates to improvements in single-handle mixing faucets of the type shown in copending application Ser. No. 529,498, now U.S. Pat. No. 3,460,571 filed Feb. 23, 1966 in the name of Alfred M. Moen.

One purpose of the present invention is a single-handle mixing faucet mounting arrangement in which the body member of the faucet is fastened to an underlying support by means of a screw or threaded member which extends completely through the body member for accurate and positive fastening of the two members together.

Another purpose is a mixing faucet of the type described in which the mixing chamber is a part of the handle and in which the entrance into the mixing chamber is formed by a plurality of generally uniformly arranged hot and cold water ports, there being more cold water ports than hot water ports, to provide substantial rotation of the handle within the comfort zone.

Another purpose is a mixing faucet of the type described including built-in diverter means—.

Another purpose is a faucet of the type described in which the body member containing the inlet passages also contains a pair of discharge passages and there are cooperating means on the handle and the body member to provide for selection of one or the other of the discharge passages.

Another purpose is a mixing faucet of the type described in which a sleeve, reciprocal and rotatable on the body member, is effective to control the volume and temperature of water discharge, with the water being fed to a remote or adjacent spout.

Other purposes will appear in the ensuing specification, drawings and claims.

BRIEF DESCRIPTION OF THE DRAWINGS

The invention is illustrated diagrammatically in the following drawings wherein:

FIG. 1 is a side view of a faucet of the type described, with portions in section and with portions broken away for clarity, FIG. 2 is a side view of the body member used in the faucet of FIG. 1, FIG. 3 is an axial section along plane 3—3 of FIG. 2, FIG. 4 is a horizontal section along plane 4—4 of FIG. 2, FIG. 5 is a side view, with portions broken away, showing the sleeve forming a part of the handle means in the faucet of FIG. 1, FIG. 6 is a section along plane 6—6 of FIG. 5, FIG. 7 is a partial side view, similar to FIG. 5, but showing the opposite side of the sleeve, FIG. 8 is an axial section through a modified form of the invention, FIG. 9 is a section along plane 9—9 of FIG. 8, FIG. 10 is a section along plane 10—10 of FIG. 8, FIG. 11 is an axial section, similar to FIG. 8, but showing yet a further modified form of the invention, FIG. 12 is an axial section showing an additional modified form of the invention, and FIG. 13 is a section along plane 13—13 of FIG. 12.

DESCRIPTION OF THE PREFERRED EMBODIMENT

In FIG. 1, a faucet for use in a kitchen has a spout 10, pivotally mounted on a support 12. A decorative outer shell 14 encloses a diverter 16 with the bottom of the shell 14 being mounted on a sink base or the like 18. Water from the faucet control is brought to the diverter assembly 16 through a conduit 20. The diverter 16 is effective to direct water either to the spout 10 or downwardly through a diverter passage 22 to a hose 24 which will lead to the conventional kitchen sink spray.

The faucet control is at the right-hand side of FIG. 1. A handle is indicated at 26 and is reciprocal and rotatable on a body member 28. The body member 28 is mounted on a support 30 which in turn is fastened to a decorative housing 32 by a bracket 34 positioned on the underneath side of the sink base 18. A threaded rod 36 extends downwardly from the support 30, through a bore in the sink base 18, and receives a threaded sleeve 38. Hot and cold water inlet pipes are indicated at 40 and 41. The inlet pipes, along with the discharge conduit 20, pass through the sink base 18 and are in communication with aligned passages in the support 30. The inlet passages in the support 30 are in communication with mating passages in the body member 28 which are illustrated in FIG. 2 and 3.

Turning specifically to FIGS. 2, 3 and 4—, the body member 28 has a guide projection 44 at its lower end which fits into a mating recess in the support 30. Hot and cold water passages 46 and 48 extend vertically upwardly into the body member and connect with radially extending portions 50 and 52 which terminate on the exterior of the body member. Seal rings, one of which is shown at 51 in FIG. 1, may be positioned in the annular grooves 54 and 56 surrounding the passage terminations 50 and 52. At the upper end of the body member 28 there is a groove 58 holding an annular seal ring 59 for use in sealing the exterior of the body member and the handle means to be described hereinafter. A similar groove 60, holding a seal ring 61, on the opposite side of the passage terminations 50 and 52, seals the lower end of the body member. The discharge passage 62 extends axially through the body member and is in communication with a cutaway portion 64 on one side of the body member. The cutaway portion 64 will be placed in selective communication with the mixing chamber in the handle means as described hereinafter. An additional axially extending radially offset bore 66 in the body member receives and elongated screw 68, illustrated in FIG. 1, for use in attaching the body member to the support 30. The screw 68 extends completely through the body member and into the support 30. It is important to have the screw 68 axially directed, but yet radially offset from the axis of the body member. Also, it is important that the screw extend from the top of the body member, completely through its length, and into the support. Thus, a more positive support is provided.

As illustrated in FIG. 1, a screw or the like 70 extends through an opening 72 in the handle 26 to attach the handle to the body member. There is a groove 74 on the body member which receives the end of the screw 70 and permits limited reciprocation and rotation of the handle.

Water coming upwardly through the passages 46 and 48, and then discharging at the exterior of the body member, will flow into the handle member 26, which is made up of two parts, an outer handle 76 illustrated in FIG. 1, and an inner sleeve 78 illustrated in FIGS. 5, 6 and 7. The sleeve 78 has an inner diameter 80 approximating, within tolerances, the outer diameter of the body member. Water will pass from the passage terminations 50 and 52 through the plurality of water ports indicated generally at 82 into a chamber 84 defined by the interior of the handle 76 and a cylindrical wall 86. The details of the handle construction are illustrated in the above-mentioned copending application. Grooves 88 and 90, positioned on opposite sides of the cylindrical wall 86, support seal rings 89 and 91 to provide a seal for the mixing chamber. Water within the mixing chamber can flow outwardly therefrom through port 92 to the cutaway area 64.

The particular disposition and shape of the ports 82 is important. The hot water ports are illustrated in FIG. 5. The ports are arranged in parallel rows which extend circumferentially, with the ports in each row being axiallaligned with each other. Note that there are more ports in one row than the other. The cold water ports are illustrated in FIG. 7. There are an equal number of ports in each row, and more cold water ports than hot water ports. Thus, there is greater rotation of the handle within the comfort zone or within the zone of normal water usage. The single row of hot water ports are so positioned that rotation of the handle toward the hot direction will initially bring only hot water ports 94 into communication with the hot water body member discharge. When the handle is turned further toward the hot side, the double row of hot water ports will come into communication with the body member discharge.

As described above, water from within the mixing chamber will flow through port 92 into the cutout area 64 and then down through the discharge passage 62. The water will then be directed through pipe or conduit 20 to the diverter 16 for ultimate use either from the spout 10 or from the conventional kitchen spray. The invention should not be limited to a kitchen application, as it is obvious that water from the conduit 20 could go directly to a lavatory basin discharge rather than to a kitchen faucet.

FIGS. 8, 9 and 10 show a modified form of the invention in which a diverter is built into the faucet control. The control handle is indicated at 100 and has a discharge chamber 102 formed by the handle and a sleeve 104 similar to that illustrated in FIGS. 5, 6 and 7. A body member 106 is the same as that illustrated in FIGS. 2, 3 and 4. except that there is a circumferentially extending groove 108 generally midway of the body member. There are a pair of axially extending grooves 110 and 112 on the exterior of the body member which connect with the groove 108. A screw 114 extends through the handle member 100 and into the grooves 108, 110 and 112.

Turning particularly to FIGS. 9 and 10, there are a pair of discharge passages 116 and 118 and a pair of water inlets 120 and 122. The discharge passages 116 and 118 may connect to discharge conduits 124 and 126. The construction illustrated may find application in a bathtub in which it is desired to select either a tub or shower discharge. In the position of FIG. 8, assuming the passage 116 leads to a shower, the handle 100 may be rotated and reciprocated within the circumferential and axial limits of groove 110. Handle 100 is pulled to the left, to place it in an open or operating position. Once the screw 114 is away from the annular groove 108, the groove 110 limits its reciprocal and rotational movement. When it is desired to change from a shower discharge to a tub discharge, handle 100 is placed in the fully closed position. The handle can then be rotated through 180° as the screw 114 is positioned within the circumferentially extending groove 108. When the handle has been rotated to the tub discharge position, screw 114 is movable in groove 112 to control water volume and temperature for the tub discharge. Sleeve 104 has a series of discharge ports 128 which connects with mixing chamber 102. Ports 128 are slots generally in circumferential alignment with the screw 114 so that the proper discharge will be provided by handle rotation.

In FIG. 11 the structure is generally similar to that described above, except that a handle or sleeve 130 has an open top for mounting a spout discharge indicated at 132. The member 132 has a spout 134 with a conventional aerator attachment and a water passage 136 which connects the aerator to a discharge passage 138 within the body member. Note that the passage 138 extends in a direction opposite to that of the inlet passages which were described in connection with the other forms of the invention. Water flows from the cutaway portion 140 upwardly through passage 138 into the chamber 136 and then out of spout 134. The member 132 is fastened by means of a screw or the like 142 into the top of the body member 144.

The principal difference in the construction of FIG. 11 over the other forms of the invention is that the discharge is in a direction opposite to that of the water inlets. The handle 130 is in the nature of a sleeve which provides for rotation and reciprocation and thus selective control of water volume and temperature. Rather than having the spout contiguous with and directly attached to the body member, the actual water discharge could be remote from the handle control, as it would than merely be necessary to attach a conduit at the discharge 138 and extend the conduit to an appropriate spout location.

FIGS. 12 and 13 show a somewhat similar construction. A spout indicated at 150, having a stem 151, may be attached by a collar or the like 152 to a spout support 154. There is an internal passage or chamber in the spout stem 151 which connects to a passage 158 at the upper end of the body member 160. The body member 160 may be similar, except for the passage 158 and the spout support 154, with that shown in the other forms of the invention. An outer shell 162 surrounds the body member and, with a sleeve 164, defines a mixing chamber 166. Rotation and reciprocation of the shell 162 is controlled by a handle 168 which extends through a slot 170 in the shell and is then fastened within a groove 172 in the lower end of the body member. Thus, rotation and reciprocation of handle 168 is effective to rotate the shell and its attached sleeve 164 to control the volume and temperature of the water discharge through passage 158 and into spout 150. The various construction details of the body member and the sealing means between the sleeve and the shell 162 have not been described in detail as they are similar to that shown in the other forms of the invention. In effect, the combination of the handle member 168 and the shell 162 are the equivalent of the handles illustrated in the other forms of the invention.

Whereas the preferred form of the invention has been shown and described herein, it should be realized that there are may modifications, substitutions and alterations thereto within the scope of the following claims.

We claim:

1. In a hot and cold water mixing valve, a body member having hot and cold water inlet passages terminating on the exterior of said body member, movable means reciprocal and rotatable on said body member and including a confined circumferentially extending mixing chamber, a plurality of entrance ports into said chamber, there being two sets of ports, one for hot water and one for cold water, there being more cold water ports than hot water ports, said entrance ports being in said movable means and of less circumferential extent than the chamber, said entrance ports being arranged in generally parallel circumferentially extending rows, there being a reduced number of rows of hot water ports in the hot water port area first encountered upon rotation of the movable means toward the hot direction, outlet means in communication with said mixing chamber, selective rotation and reciprocation of said movable means relative to said body member placing said hot and cold water inlet passages into selective communication with said movable means mixing chamber to vary the temperature and volume of water discharged to said outlet means.

2. The structure of claim 1 further characterized in that said entrance ports in each row are generally axially aligned with the ports in an adjacent row.

3. In a fluid mixing valve, a body member having a plurality of inlet passages terminating on the exterior of said body member, movable means reciprocal and rotatable on said body member and including a confined circumferentially extending mixing chamber, entrance ports into said chamber, said entrance ports being in said movable means and of less circumferential extent than the chamber, outlet means in communication with said mixing chamber including a plurality of outlet passages in said body member, selective rotation and reciprocation of said movable means relative to said body member placing said inlet passages into selective communication with said movable means mixing chamber to vary the relative proportions and volume discharged to said outlet means, and cooperating means on said body member and movable means for selecting one or the other of said outlet passages.

4. The structure of claim 3 further characterized in that said pair of outlet passages are diametrically spaced, one from the other, said body member including means for providing complete circumferential rotation of said movable means in one axial position of said movable means, and limited circumferential rotation of said movable means in a second axial position.

5. The structure of claim 3 further characterized in that said cooperating means includes an annular groove on said body member and a projection on said movable means positioned in said groove.

6. The structure of claim 5 further characterized by and including a pair of diametrically opposed axially extending grooves in the exterior of said body, member, said axially extending grooves opening into said annular groove.

7. In a fluid mixing valve, a body member having a plurality of inlet passages terminating on the exterior of said body member, movable means reciprocal and rotatable on said body member and including an confined circumferentially extending mixing chamber, entrance ports into said chamber, said entrance ports being in said movable means and of less circumferential extent than the chamber, and outlet passage in said body member in communication with said mixing chamber and extending in a direction opposite to that of said inlet passages, selective rotation and reciprocation of said movable means relative to said body member placing and inlet passages into selective communication with said movable means to vary the relative proportions and volume discharged to said outlet passage.

8. The structure of claim 7 further characterized by and including spout support means on said body member, said outlet passage opening into said spout support means.

9. In a single handle hot and cold water mixing faucet, a body member having hot and cold water inlet passages terminating on the exterior of said body member, handle means reciprocal and rotatable on said body member and including an annular mixing chamber, a pair of discharge passages in said body member arranged to be placed in selective communication with said annular mixing chamber, cooperating means on said body member and handle means for selecting one or the other of said pair of discharge passages, selective rotation and reciprocation of said handle means relative to said body member placing said hot and cold water inlet passages into selective communication with said handle means annular mixing chamber to vary the volume and temperature of water discharged to one of said discharge passages.

10. The structure of claim 9 further characterized in that said cooperating means includes a groove on said body member and means on said handle means projecting into said groove.

11. In a single handle hot and cold water mixing faucet, a body member having hot and cold water inlet passages terminating on the exterior of said body member, handle means reciprocal and rotatable on said body member and including an annular mixing chamber, a discharge passage in said body member extending away from said hot and cold water inlet passages, spout support means seated on said body member and having passage means therein in communication with said discharge passage, selective rotation and reciprocation of said handle means relative to said body member placing said hot and cold water inlet passages into selective communication with said handle means annular mixing chamber to vary the volume and temperature of water discharged to said discharge passage.

* * * * *